United States Patent [19]

Gold

[11] 4,311,035
[45] Jan. 19, 1982

[54] TEST DEVICE FOR ACCELERATION SENSORS

[75] Inventor: Henning Gold, Bingen, Fed. Rep. of Germany

[73] Assignee: Fraunhofer-Gesellschaft zur Förderung der angewandten Forschung e.V, Munich, Fed. Rep. of Germany

[21] Appl. No.: 103,269

[22] Filed: Dec. 13, 1979

[30] Foreign Application Priority Data

Dec. 20, 1978 [DE] Fed. Rep. of Germany ....... 2855162

[51] Int. Cl.$^3$ ............................................. G01P 21/00
[52] U.S. Cl. ........................................ 73/1 D; 73/12
[58] Field of Search ............ 73/1 D, 12, 665, 432 SD

[56] References Cited

U.S. PATENT DOCUMENTS

| 2,604,777 | 9/1952 | Armstrong et al. | 73/12 |
| 3,079,786 | 3/1963 | Fooler et al. | 73/12 |
| 3,148,530 | 9/1964 | Woods | 73/665 X |
| 3,845,665 | 11/1974 | Cappetta et al. | 73/1 D |

Primary Examiner—James J. Gill
Attorney, Agent, or Firm—John C. Smith, Jr.

[57] ABSTRACT

A test device for acceleration sensors comprises a low-friction carriage in particular supported by an air cushion. A drive is coupled to the carriage for producing a predetermined acceleration course of the carriage and a test object secured thereto. A direct pneumatic drive is provided at the carriage and has at least one piston and at least one cylinder defining an air space. A control device is arranged upstream of the air space and adapted to cause a pressure course in the air space corresponding to the desired acceleration course.

13 Claims, 7 Drawing Figures

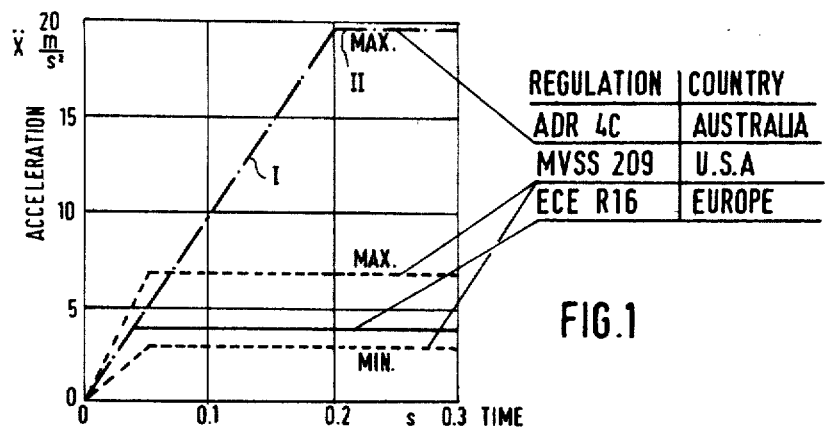
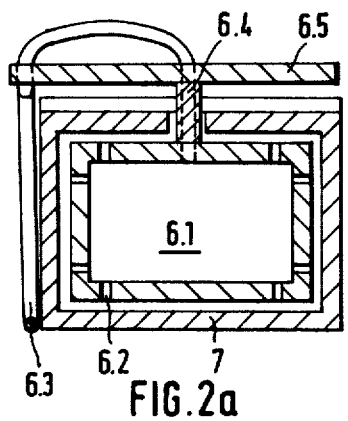
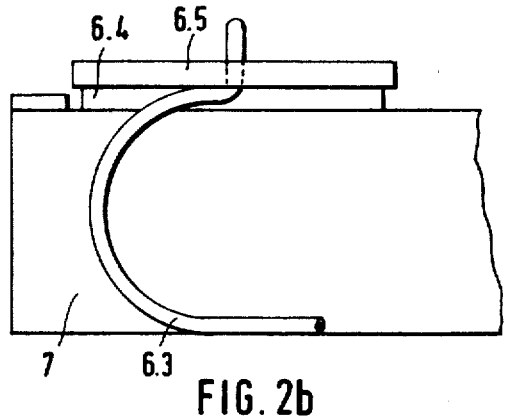
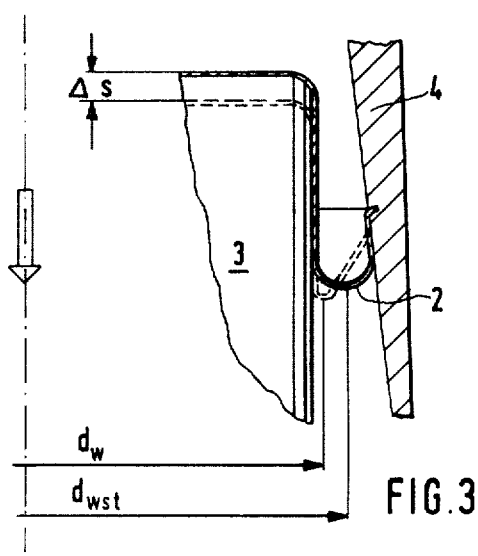

TEST DEVICE FOR ACCELERATION SENSORS

BACKGROUND OF THE INVENTION

This invention relates to a test device for acceleration sensors.

Acceleration sensors are electrical elements which respond at a defined acceleration and perform a mechanical or electrical switching operation. They for instance serve to release automatic passive and active retaining systems, in particular for vehicle passengers (automatic belt; air bag, belt tensioner). For developing and testing such sensors, a test arrangement is required which produces a motion course X at which an acceleration $\ddot{X}$ is kept constant throughout a predetermined period of time. The value of $\ddot{X}$ must be continuously adjustable. It is to be obtained at the beginning of the motion course in a defined form without any over-oscillation. Desired acceleration courses have been illustrated in FIG. 1. The motion course X accordingly may be divided into the two following sections:

I. Acceleration increase $\dddot{X}$

The acceleration is to increase linearly, i.e. $\dddot{X}$=constant. The increase is to be variable. The transition into the constant acceleration $\ddot{X}$=constant is to be effected without any over-oscillation in as short a period of time as possible (sharp-edged).

II. Constant acceleration $\ddot{X}$

The value of the constant acceleration is to be indefinitely variable.

All test devices known up to now for acceleration sensors use as basis for the sensors to be tested an air-supported carriage in order to keep vibrations as low as possible.

Biased rubber belts several meters in length are used as drive, which accelerate the carriage approximately constantly throughout a limited distance. The starting process is accomplished by a defined releasing of a brake. The return movement is effected via a separate pneumatic or hydraulic system.

With such carriage drives, the following problems arise:

a. The acceleration increase $\dddot{X}$ is not constant.

b. When merging into constant acceleration $\ddot{X}$, an over-oscillation occurs.

c. The acceleration decreases slightly along the traveling distance because of the nature of the drive.

Also, there is the further difficulty with the conventional test devices that the acceleration diagrams are not unambiguously reproducible so that a variety of tests are required in order to obtain an acceleration course in accord with regulations.

SUMMARY OF THE INVENTION

An object of the invention therefore is to provide a test device for acceleration sensors which realizes a desired acceleration course which is unambiguously reproducible and wherein the deficiencies mentioned under a. to c. above do not occur.

To attain this object the present invention provides a test device for acceleration sensors, comprising a low-friction carriage in particular supported by an air cushion, drive means coupled to the carriage for producing a predetermined acceleration course of the carriage and a test object secured thereto, a direct pneumatic drive provided at the carriage and having at least one piston and at least one cylinder defining an air space, and control means arranged upstream of the air space and adapted to cause a pressure course in the air space corresponding to the desired acceleration course.

As a result of the direct pneumatic drive of the carriage as well as a result of the specific configuration of the control and drive means, it is permitted to realize the respectively desired acceleration course exactly and reproducibly without interfering accompanying phenomena occurring.

BRIEF DESCRIPTION OF THE DRAWINGS

An embodiment of the invention will now be described by way of example and with reference to the accompanying schematic drawings in which:

FIG. 1 is a diagram of various officially prescribed acceleration courses for testing acceleration sensors;

FIG. 2a and 2b are details of the carriage drive as illustrated in FIG. 2;

FIG. 3 shows the arrangement of a rolling bellows between conical piston and cylinder surfaces as well as the alteration of rolling bellows deflection upon beginning of movement of the carriage;

DESCRIPTION OF THE PREFERRED EMBODIMENT

FIG. 1 shows acceleration courses officially prescribed in various countries for testing acceleration sensors for passive retaining systems in automotive vehicles. It will be noted from the curves illustrated that for a generally usable test device the magnitude of the constant acceleration to be obtained must at least be adjustable in the range of 2 to 20 m/sec$^2$.

Figure 2:
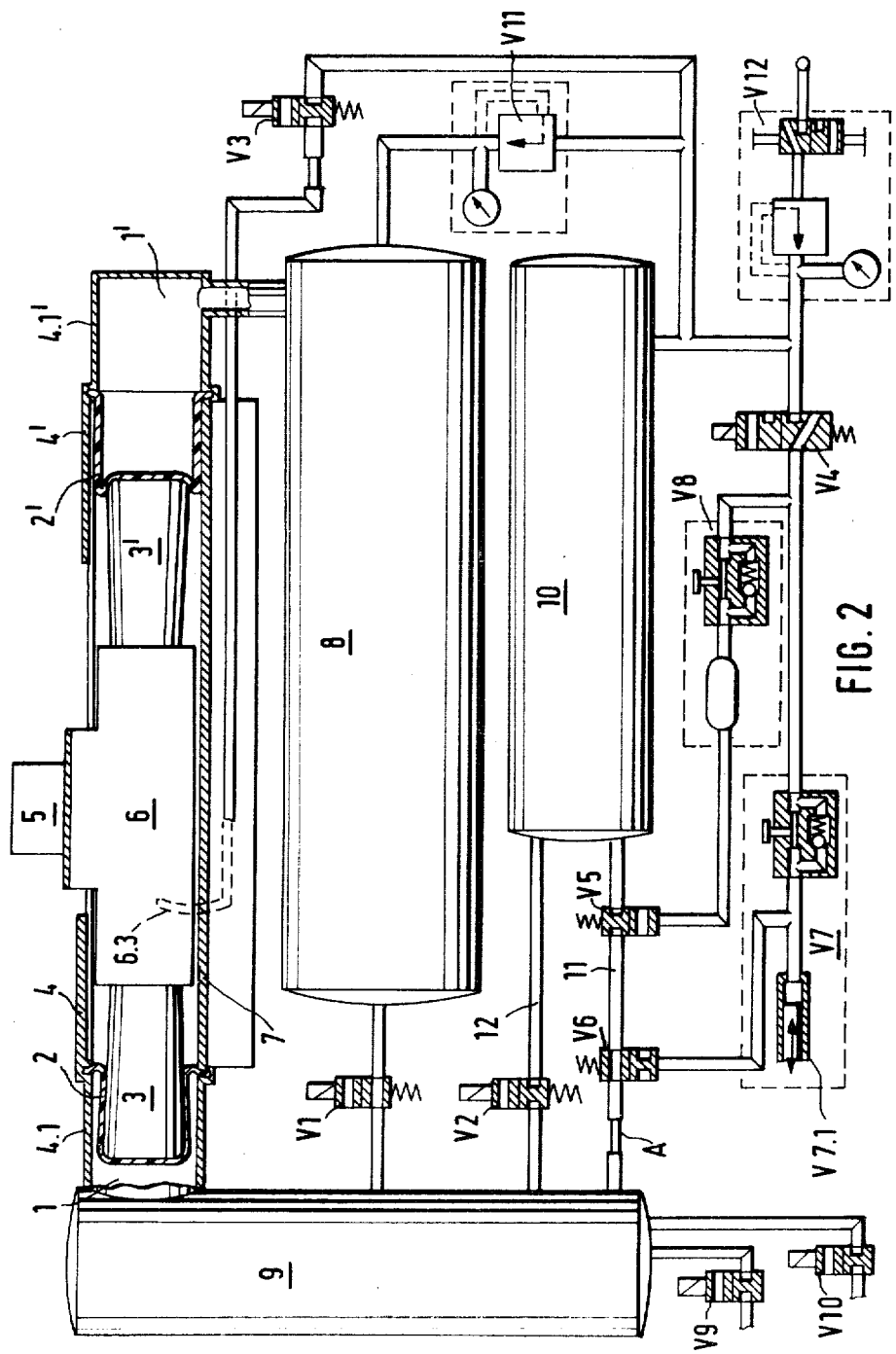
FIG. 2 is a simplified illustration of the mechanical parts with the carriage drive in a longitudinal section as well as with the pneumatic arrangement of the test device.

An overall illustration of the essential mechanical parts of a test device according to the invention with the pneumatic control arrangement is included in FIG. 2 with a special consideration of the carriage drive which has been illustrated in a vertical longitudinal section. Details of the carriage and the air supply to the carriage are shown in FIGS. 2a and 2b.

The carriage 6 at the bottom has a hollow carriage body 6.1 rectangular in cross section which moves in a stationary Tee groove shaped bed 7 and has at the bottom, at the sides and at the top air exit bores 6.2 for an air cushion. The air exit bores 6.2 are so arranged at the carriage body 6.1 and distributed there that five freedom degrees of the carriage 6 are confined and only the freedom degree in direction of movement remains. The compressed air required for the air cushion is supplied to the carriage body via a valve V3 and a hose loop 6.3 rolling off alongside the bed 7. For reduction of noise of the device and the air consumption, the air supply may be opened when the carriage 6 is started and closed again after returning via a delay switch ES3.Z. The carriage body 6.1 has at the top a longitudinal web 6.4 arranged midway which protrudes from the Tee groove shaped bed 7 and carries an assembly plate 6.5 for one or more test objects 5 (e.g. belt automatics).

At its two end faces, the carriage 6 supports respective pistons 3 and 3' the axes of which extend in the direction of movement of the carriage. The pistons 3 and 3' move in respective cylinders 4 and 4'. They are sealed relative thereto by thin-walled rolling bellows 2 and 2'.

In the bellows cups 4.1 and 4.1' provided adjacent to the respective cylinders 4 and 4', the rolling bellows 2 and 2' each sealingly seclude an air space 1 or 1'. The pressure in the air spaces 1 and 1' exerts via the effective bellows areas defined by the rolling bellows 2 and 2' a force upon the pistons 3 and 3' and thus a resulting force upon the carriage 6. When the pressures in the two air spaces 1 and 1' are equal, no resulting force acts upon the carriage. When the pressure in the left-hand air space 1 in FIG. 2 is greater than in the right-hand air space 1', the carriage moves to the right, in the reverse case to the left in FIG. 2. When the pressure differential is constant, the drive force is also constant and thus also the acceleration of the carriage. When the pressure differential increases linearly, the carriage acceleration also increases linearly.

The air space 1 is connected via a large cross section to an air tank 9, and latter is connected via a line 11 with a restriction cross section A to a compressed-air reservoir 10, while the air space 1' is in communication with a further air tank 8 with low restriction.

A linear pressure increase in the air tank 9 and thus also in the air space 1 is obtained by supplying compressed air from the reservoir 10 via the restriction cross section A with a constant flow rate. Since the flow rate in the restriction cross section A in the subsonic range depends on the pressure differential in the tank 9 and the reservoir 10 connected via the restriction cross section A, but the pressure differential varies as a result of the quantity of air income, it is required to make the pressure differential so large that during the entire overflowing process from the reservoir 10 to the tank 9 an overcritical pressure condition exists at the restriction cross section A. The restriction cross section A is shaped in such a way that no flow velocity occurs which is quicker than sound. At the most restricted cross section of the restriction, there is then a constant flow velocity during the entire overflowing process, namely sonic velocity. Latter only depends on the temperature in the reservoir 10 and on the absolute pressure in the pressure tank 9. The small alteration of the volumetric flow resulting therefrom is immaterial for the instant application. When setting low acceleration rates, so minor absolute pressure variations may result in the pressure tank 9 and the pressure reservoir 10 that even below the critical pressure condition a sufficiently constant volumetric flow is insured. The rate of the acceleration increase $\ddot{X}$ is proportional to the restriction cross section A and the carriage mass and may be adjusted by these magnitudes. When thus compressed air is supplied to the tank 9 and thus to the left-hand air space 1 in FIG. 2 via the restriction cross section A through which air flows with about sonic velocity, the carriage 6 moves with a constant acceleration increase ($\ddot{X}$=constant). As soon as the air supply is interrupted, the pressure differential acting upon the pistons 3 and 3' remains generally constant for a large volume of the air tanks 8 and 9, so that the carriage moves on with constant acceleration $\dot{X}$. Because of the finite size of the air tanks 8 and 9, the variations of the air spaces 1 and 1' occurring because of the piston movements cause pressure variations in these spaces, however. This undesired effect is counteracted by a conical configuration of the piston and/or cylinder surfaces which affects the effective cross section of the rolling bellows 2 and 2'. The taper is selected such that the product of the respective pressure and the effective bellows surface at a constant air weight in the total volumes of the spaces 1 and 9 or 1' and 8 respectively confined by the rolling bellows 2 or 2' is always constant, independent of the piston position. This condition need not be fulfilled by each piston volume pair per se, but only by the sum of both pairs.

The arrangement of a rolling bellows between conical piston and cylinder surfaces is shown in FIG. 3. Therein, $d_w$ represents the diameter of the rolling bellows decisive for force transmission which determines the effective operative area $A_w$ of the rolling bellows. For determining $d_w$, the following bellows property is to be observed:

The rolling bellows located between the cylinder wall and the piston wall defines with the piston stationary a generally semi-circular rolling bead (full line in FIG. 3) with an effective bellows diameter dwst. When piston and cylinder move axially toward one another, however, the rolling bead deforms as a result of adhesion asymmetrically according to the dotted line. Thereby, the decisive bellows diameter $d_w$ results. When this process is effected during the defined acceleration phase of the carriage, by a variation of the effective operative area $A_w$ the acceleration course is impaired. This becomes especially critical when the value of constant acceleration is low. Because the discussed rolling bead deformation is effected along the first 5 to 10 mm of the carriage travel distance αS, however, and thus remains constant independent of velocity, it is required at least for low carriage accelerations to have the carriage start moving slowly before the defined acceleration course starts. The carriage must therefore have a pre-motion phase before the defined acceleration phase starts.

Figure 4:
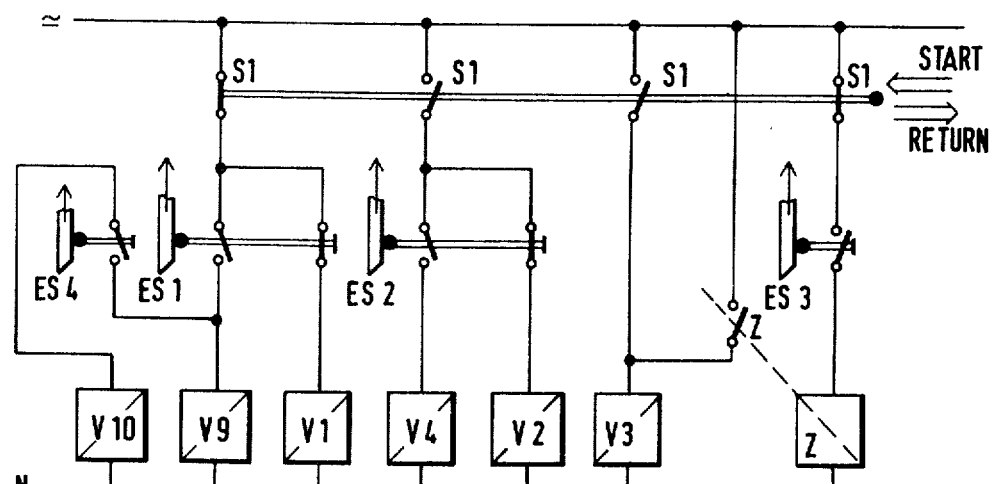
FIG. 4 is an electrical circuit diagram of the test device.

Referring to the pneumatic operation diagram according to FIG. 2 and the electrical circuit diagram of FIG. 4, hereinafter the motion course of the carriage is explained, valves and switches being in initial positions.

In its initial position, the carriage 6 is located at the left-hand side in FIG. 2. The two air tanks 9 and 8 are interconnected via a valve V1 so that in both tanks the same pressure exists. Because of the taper of the pistons 3 and 3' and the cylinders 4 and 4', the effective operative area of the left-hand rolling bellows 2, however, is smaller than that of the right-hand bellows 2'. This results in a resulting force acting upon the carriage 6 which is thus urged against its left-hand abutment not illustrated and thus is given a defined initial position. The abutment must be relatively hard. Its resiliency distance should not be larger than the pre-motion distance αs (FIG. 3) required for forming the bellows bead, because the abutment would otherwise interfere with the linearity of the acceleration increase.

When pressing a start button S1 (FIG. 4), 1. the valve V1 is shut and thus the communication between the air tanks 9 and 8 is interrupted, 2. via a valve V2 a small overflow cross section between the reservoir 10 and the air tank 9 is opened. The overflow cross section must be so small that the carriage now slowly moves and the form of the bead at the rolling bellows 2' and 2 is able to adjust to the decisive bellows diameter $d_w$ (FIG. 3), 3. via the valve V3 the line 6.3 to the air cushion is released. The air cushion has sufficient time to build up its bearing capacity, because the carriage 6 is only able to move when the pressure differential in the air spaces 1 and 1' is large enough in order to compensate the differential of the effective bellows areas.

After a carriage travel Δs of about 5 to 10 mm, the carriage 6 operates a further switch ES2. Thereby, 1. by the valve V2 the small overflow cross section is shut, 2. by a valve V4 the control for the acceleration course is switched in, i.e. the line 11 with the restriction cross section A between the compressed-air reservoir 10 and the air tank 9 is opened and then shut again for a predetermined period of time as follows.

The opening duration to the restriction cross section A for a predetermined acceleration increase $\dot{X}$ is a measure for the value of the constant acceleration course $\ddot{X}$. For a linear acceleration increase of $\dot{X} = 100$ m/sec$^3$, for instance a period of 0.02 secs is required in order to obtain a constant acceleration of $\ddot{X} = 2$ m/sec$^2$. This short period of time between opening and shutting is not able to be realized with commercial pneumatic valves. Therefore, an opening valve (opener) V5 and a shutting valve (shutter) V6 are arranged in series. The valves V5 and V6 are pneumatically controlled for achieving switching processes as quickly as possible. Their valve cross sections are to be substantially larger than the restriction cross section A so that the effect of the valve movement on the decisive overflow cross section is maintained restricted to a period of time as short as possible.

The valves V5 and V6 are each controlled via a pneumatic delay valve V8 or V7 which is adjustable. The two delay valves are concurrently controlled by a common control valve V4. The opening duration is a result of the difference between the delay duration of the shutter V6 and the delay duration of the opener V5.

The delay valve V7 of the shutter conveniently consists of a constant restriction and a variable volume which may be defined by a piston V7.1 slidable in a cylinder. The piston travel is proportional to the volume and thus proportional to the delay duration of the shutter. The delay valve V8 for the opener V5 is necessary for a correlation of the difference response times of the two valves V5 and V6 which are caused by lost volumes such as hose lines. This delay valve V8 consists of a variable restriction and a constant volume, as commercially available. Non-linearity of such valves is not troublesome for the correlation process. For a proper correlation by means of the delay valve V8 for the opener V5, the adjustable piston travel of the delay valve V7 for the shutter V6 is proportional to the opening duration and thus proportional to the desired acceleration $\ddot{X}$ of the carriage 6. Because the piston travel of the delay valve V7 is selectably variable, the value of carriage acceleration may also be varied selectably. When the air pressure for controlling the delay valves remains constant, a good reproducibility of the delay durations is provided for.

When the start button S1 is brought into the OFF position, 1. the two valves V5 and V6 (opener and shutter) are brought into their initial positions by venting. The opener V5 is vented more quickly than the shutter V6 in order to avoid a flowing of air from the compressed-air reservoir 10 into the air tank 9, since this would result in unnecessarily long resetting periods of the carriage 6.

2. the pressure tank 9 is relieved via a flow-off valve V9 so that the pressure differential between the air spaces 1 and 1' degrades and the carriage 6 moves back. During returning, the carriage operates the switch ES1 which shuts the flow-off valve V9 and opens the connecting valve V1.

For achieving a quick return movement, it is convenient to use two flow-off valves V9 and V10 which are simultaneously opened so that the air is able to flow out of the air tank 9 as quickly as possible. In order to avoid a too hard engagement of the carriage with its abutments, the flow-off valve V10 is shut by a switch ES4 after about half the return movement of the carriage.

The carriage is now ready for the next motion course, as soon as the air pressures in the tanks have reached their predetermined ratings. In order to keep this period of time as short as possible, it is convenient to supply the control air from a separate vessel. With the exception of the opener V5 and the shutter V6, all valves are controlled electrically. Basically, this would also be possible for the valves V5 and V6. The commercially available controls, however, result in too slow valve motions. Therefore, the valves V5 and V6 are controlled pneumatically. The other valves may also be controlled pneumatically.

Figure 5:
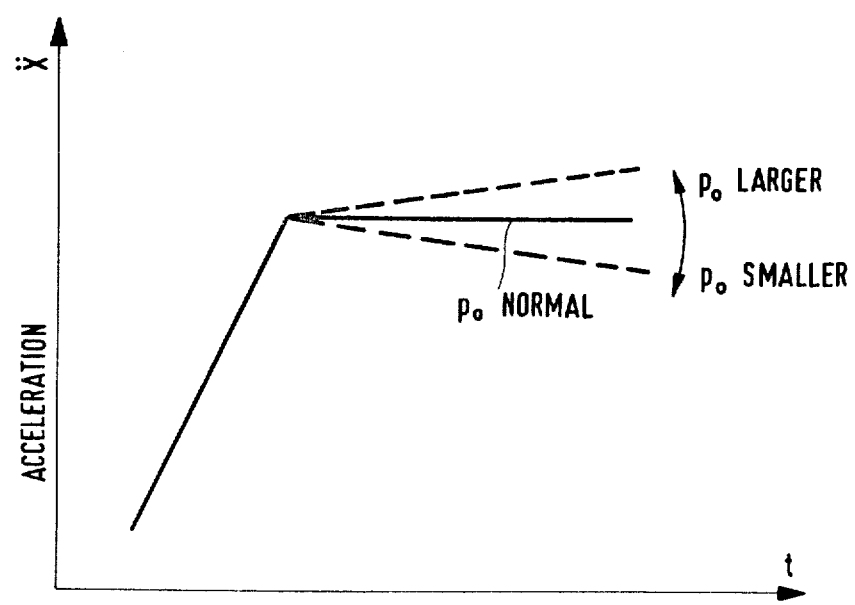
FIG. 5 is a diagram of the fundamental dependency of the acceleration course on the initial pressure.

The initial pressure $p_o$ in the air tanks 9 and 8 may be adjusted by a pressure control valve V11. Because the pressure variations occurring are linearly correlated to the absolute pressure, but the drive force for the carriage depends in the overpressure in relationship to ambient pressure, the constancy of the acceleration $\ddot{X}$ may be effected more simply by a variation of the initial pressure $p_o$ in the tank 9 and the reservoir 10 than by the taper of the pistons 3 and 3' and the cylinders 4 and 4' as well as by the size of the air volumes 1 and 9 or 1' and 8. A reduction of the initial pressure $p_o$ results in a slight reduction of the previously constant acceleration. For increasing the initial pressure, a corresponding acceleration increase is obtained. Thereby, the effects are able to be compensated which the test object 5, e.g. by belt extraction force variations, exerts upon the carriage 6. In FIG. 5, the variation of the acceleration course by a variation of the initial pressure $p_o$ has been illustrated. The initial pressure $p_o$ is adjusted by the control valve V11.

The entire pneumatic arrangement of the test device is supplied from a compressed-air source via an air supply unit V12.

The invention may be embodied in other specific forms without departing from the spirit or essential characteristics thereof. The embodiment is therefore to be considered in all respects as illustrative and not restrictive.

What is claimed is:

1. A test device for subjecting acceleration sensors to acceleration, wherein the acceleration is increased linearly for an initial predetermined period of time followed by a predetermined time period in which the acceleration is constant, comprising
   (a) a low-friction carriage adapted for supporting acceleration sensors and means providing an air cushion for said carriage;
   (b) drive means coupled to the carriage for producing a predetermined acceleration course of the carriage;
   (c) a direct pneumatic drive provided at the carriage and having at least one piston and at least one cylinder defining an air space; and
   (d) control means adapted to initially direct air from an air supply into said air space at a constant rate to cause the pressure in the air space to increase linearly and then suddenly to shut off said air supply to said air space after a predetermined period of time.

2. A test device as set forth in claim 1, wherein the air space has upstream thereof a large-volume air tank connected to said air space via a passage having a large cross section, said air tank being connected to a compressed-air reservoir via a connecting line containing a restricted cross section, the pressure in the compressed-air reservoir being so high that the restricted cross section is passed with about sonic velocity.

3. A test device as set forth in claim 2, wherein quickly opening and quickly shutting valve means are provided in the connecting line.

4. A test device as set forth in claim 3, wherein the valve means comprise two valves in series of which the one opens especially quickly and the other shuts especially quickly.

5. A test device as set forth in claim 4, wherein for suppressing the motion flow of the valves there is provided for each of these valves a common, simultaneously controllable and separately adjustable delay unit.

6. A test device as set forth in claim 5, wherein the valves are pneumatically operated and the delay units comprise control valves with upstream restriction or volume stretch wherein one of the restriction or the volume is adjustable e.g. by a shiftable piston.

7. A test device as set forth in claim 2, wherein for varying the acceleration increase the restricted cross section in said connecting line is variable in its size.

8. A test device for acceleration sensors, comprising
(a) a low-friction carriage adapted for supporting acceleration sensors and means providing an air cushion for said carriage;
(b) drive means coupled to said carriage for producing a predetermined acceleration course of said carriage;
(c) a direct pneumatic drive provided at the carriage and having a piston and a cylinder defining an air space at one side of said carriage; and
(d) control means adapted to cause the pressure course in the air space corresponding to the desired acceleration course;
(e) at least one of said piston and said cylinder being formed conically and a rolling bellows seal being provided between said piston and said cylinder to compensate the pressure drop by the volume variation of said air space caused by travel of said piston.

9. A test device as set forth in claim 8, wherein the air space has upstream thereof a large-volume air tank connected to said air space via a passage having a large cross section, said air tank being connected to a compressed-air reservoir via a connecting line containing a restricted cross section, the pressure in the compressed-air reservoir being so high that the restricted cross-section is passed with about sonic velocity, and wherein for suppressing the bellows effects at the starting of piston movement there is provided between the air tank and the compressed-air reservoir a further connecting line including a valve.

10. A test device as set forth in claim 9, wherein for resetting the piston and for prestressing the rolling bellows before starting there are provided at the other side of the carriage in a mirror-image arrangement a further piston and cylinder with a further rolling bellows providing a further air space, a further air tank of constant pressure being connected to said further air space.

11. A test device as set forth in claim 10, wherein flow-off valves are arranged at the air tank, said valves providing a connection to atmosphere and being quickly shuttable separately.

12. A test device as set forth in claim 11, wherein the two air tanks are connectible via a shut-off valve.

13. A test device as set forth in claim 12, wherein the two tanks are connected via a pressure control valve to an air supply unit.

* * * * *